United States Patent Office 3,488,180
Patented Jan. 6, 1970

3,488,180
GILSONITE SALTS OF HERBICIDAL ACID AND
PLANT HORMONE TYPE ACIDS
Walter W. Abramitis, Downers Grove, Ill., assignor, by mesne assignments, to Armour Industrial Chemical Company, a corporation of Delaware
No Drawing. Filed May 17, 1965, Ser. No. 456,563
Int. Cl. A01n 9/22, 9/24
U.S. Cl. 71—88                                   4 Claims

ABSTRACT OF THE DISCLOSURE

The salts of herbicidal or plant hormone type acids with heterocyclic nitrogen compounds as derived from the refining of gilsonite, for plant growth regulation.

---

This invention relates to a novel class of economical herbicides and more particularly to herbicides comprising the reaction product of heterocyclic nitrogen compounds derived from gilsonite with acids selected from the group consisting of herbicidal acids and plant hormone-type acids to give salts which are desirably non-volatile. Also, these salts will not leach out and they are oil soluble, which is preferred for plant work. They are useful for either pre-emergence or post-emergence control of plants.

As is well-known, weed control is effectively accomplished with herbicides, but unfortunately, most herbicides tend to be leachable and volatile so that control over weeds is not only transitory but also hazardous to adjacent stands of valuable crop. On top of this, herbicides are fairly expensive. The trade expends considerable effort in developing an economical, non-volatile, non-leachable herbicide.

An object of the invention herein is to provide such an improved herbicide.

Another object is to provide a low-cost herbicide.

Still another object is to provide a herbicide which is substantially non-volatile.

A further object is to provide a herbicide which is substantially non-leachable.

A still further object is to provide a herbicide which by reason of its non-volatility and non-leachability, is extremely selective.

Another object is to provide a herbicide which is long-acting.

Other objects of the invention will in part be obvious and will in part appear hereinafter.

It has now been found that the reaction of nitrogen base concentrates derived from gilsonite with acids selected from the group consisting of herbicidal acids and plant hormone-type acids provide unique non-volatile herbicidal salts. These salts are oil soluble and are highly resistant to leaching. As a spray, their non-volatility provides a safe media for application. The film they create on the soil, because of their high resistance to leaching, makes them most effective as pre-emergence herbicides. They may also be used effectively as post-emergence herbicides with high activity. Their non-volatility again comes into play here, in that as a spray, the lack of volatile fumes from them prevent drift-over to adjacent valuable stands of crop.

Uniquely, the herbicidal salts produced by this invention are substantially inexpensive. This is in contrast to most amine salt herbicides which are expensive. The reason is that the gilsonite components of the salts are very inexpensive and therefore greatly reduced the cost thereof.

The gilsonite component of the salts of the invention occurs as a by-product in the manufacture by The American Gilsonite Company of petroleum products from the mineral "gilsonite", The company describes it as a material containing predominantly mixed alkylated pyridines, pyrroles, indoles, and quinolines, with some of the substituent carbon chains being olefinic. It also contains some unidentified non-nitrogenous material. However, it is believed to be an inordinately complex mixture of chemical structures. Well over one-hundred different compounds are indicated as being present in the mixture, based on gas chromatigraphic procedures. The extreme complexity of such a mixture of materials renders a complete qualitative analysis almost prohibitive.

In making the salts of this invention, utilization of all crude, semi-purified by-products and having a boiling point of greater than about 200° F. resulting from the refining of gilsonite, are utilizable. Naturally, the composition of such mixed heterocyclic nitrogenous by-products will vary with the composition of the original gilsonite, the point in the refining process from which they are extracted, the boiling range in which they are extracted and the like. The invention herein described presupposes utilization of all such mixed heterocyclic nitrogenous compounds either in crude or in purified forms; however, the preferred mixed heterocyclic nitrogen compounds in the practice of this invention are those which have a boiling range of about 200° F. to about 750° F. and particularly those which have an average boiling point within the range of about 450° to about 750° F.

The American Gilsonite Company has assigned descriptive nomenclature to various fractions of this type material as follows:

(1) Light bases from hydrocarbon feed.—Extracted from a naphtha stream of approximately 283° F. volumetric average boiling point and 222° F.–400° F. boiling range.

(2) Intermediate bases from prefractionator bottoms.—Extracted from a heavy naphtha stream of approximately 422° F. volumetric boiling point and 400° F. to 590° F. boiling range.

(3) Medium bases from light gas oil.—Extracted from a gas-oil stream of about 520° F. volumetric average boiling point and 460° F. to 665° F. boiling range.

(4) Semi-purified acid extracted nitrogen compounds.—

(a) Nitrogen Bases I—Boiling range 491° F. to 509° F. at 760 mm.

(b) Nitrogen Bases II—Boiling range 610° F. to 641° F. at 760 mm.

(c) Nitrogen Compounds III—Boiling range 700° F. to 710° F. at 760 mm.

(d) Nitrogen Compounds IV—Boiling range 745° F. to 755° F. at 760 mm.

(e) Bottoms V—Boiling range 755° F. and higher at 760 mm.

(5) Nitrogen distillate.—A crude mixture of nitrogen bases obtained by distillation an representative of 4(a) through 4(c) inclusive as above, plus some non-nitrogenous compounds.

(6) Nitrogen bases concentrate oil.—An extracted mixture of cyclic tertiary amines plus some non-basic nitrogen compounds.

(7) Pyrrole polymer oil.—An extracted mixture containing predominantly non-basic nitrogen compounds and some cyclic basic nitrogen compounds.

In all reference of gilsonite, gilsonite material, heterocyclic nitrogen compound, nitrogen bases concentrate oil and the like herein, use of any, some or all of the various fractions above is intended. All are operable, although some may have more effectiveness for particular uses.

The invention accordingly comprises the several steps and the relation of one or more of such steps with respect to each of the others, and the compound, and the composition of matter possessing the characteristics, properties, and the relation of constituents which are exemplified in the following detailed disclosure, and the scope of the invention will be indicated in the claims.

Reference is now made to detailed examples which illustrate the making of the salt, the process of which the salt is made, and the utilization of compositions employing the salts of this invention as a component therein.

EXAMPLE I

A neutral equivalent weight of gilsonite to one mole of 2,4-D(2,4-dichlorophenoxyacetic acid) are dissolved in acetone and heated together in a steam bath until the reaction is complete.

The salt formed will test as follows for herbicidal activity (pre-emergence treatment):

TABLE 1

| Rate | Weed | Percent Control | Safety to Crops | |
|---|---|---|---|---|
| | | | Crops | Percent Emergence |
| 0.75 lbs./acre | Foxtail | 96 | Sugar beets | ¹48 |
| | Lambsquarters | 88 | Cotton | 100 |
| | Amaranthus | 100 | Peas | 100 |
| | Wild Oats | 25 | Soybean | 100 |
| | | | Flax | 85 |

¹ Stunted.

EXAMPLE II

A similar reaction technique is employed, but using 2,4,5-T(2,4,5-trichlorophenoxyacetic acid) and diacetone as a solvent to form the salt of 2,4,5-T.

The salt tests as follows (pre-emergence treatment):

TABLE 2

| Rate | Weed | Percent Control | Safety to Crops | |
|---|---|---|---|---|
| | | | Crops | Percent Emergence |
| 0.75 lbs./acre | Foxtail | 20 | Sugar beets | 90 |
| | Lambsquarters | 88 | Cotton | 100 |
| | Amaranthus | 96 | Peas | 80 |
| | Wild Oats | 25 | Soybeans | 100 |
| | | | Flax | 60 |

EXAMPLE III

Silvex, (2-(2,4,5-trichlorophenoxy) propionic acid) and a neutral equivalent amount of gilsonite are dissolved in isopropyl alcohol and heated until reaction is complete.

EXAMPLE IV

The gilsonite monosalt of Endothal (3,6-endoxohydrophthalic acid) is prepared by admixing one molecular equivalent of gilsonite with the endothall, dissolved in benzene, and then heating to complete the reaction.

Table 3 illustrates field results that are obtainable using this salt:

TABLE 3

| Rate | Weed | Percent Control | Safety to Crops | |
|---|---|---|---|---|
| | | | Crops | Percent Emergence |
| 10 lbs./acre | Foxtail | 98 | Sugar beets | 90 |
| | Lambsquarter | 50 | Cotton | 100 |
| | Amaranthus | 80 | Peas | 100 |
| | Wild Oats | 75 | Soybeans | 100 |
| | | | Flax | 15 |

EXAMPLE V

The gilsonite disalt of Endothal is prepared by admixing a neutral equivalent weight of gilsonite with 3,6-endoxohydrophthalic acid (the anhydride may also be used) dissolved in petroleum ether and then heating the mixture until the reaction is complete.

Table 4, which follows, illustrates test results which are obtainable:

TABLE 4

| Rate | Weed | Percent Control | Safety to Crops | |
|---|---|---|---|---|
| | | | Crops | Percent Emergence |
| 10 lbs./acre | Foxtail | 96 | Sugar beets | 96 |
| | Lambsquarter | 10 | Cotton | 100 |
| | Amaranthus | 76 | Peas | 90 |
| | Wild Oats | 0 | Soybeans | 100 |
| | | | Flax | 25 |

EXAMPLE VI

A water emulsifiable salt of the herbicide of Example I may be made by dissolving it in a 50–50-mixture of isopropanol-diacetone solvent with 10–15% cationic Ethomeen (ethoxylated amine) as an emulsifier.

EXAMPLE VII

The 2,4,5-T gilsonite salt of Example II is best dissolved in diacetone with 10–15% Ethomeen S/25 (ethoxylated (15 moles) amine) as an emulsifier.

Other tests

Post emergence tests of gilsonite 2,4-D and gilsonite 2,4,5-T on primarily pigweed show complete kill of the weed with no injury to corn when applied at ¼ and ½ lbs. acid equivalent per acre.

In referring to "herbicidal acids" and "plant hormone-type acids" above, there is contemplated any acid which has herbicidal activity, such as, for example:

2,4-D—(2,4-dichlorophenoxyacetic acid)
2,4,5-T—(2,4,5-trichlorophenoxyacetic acid)
Silvex—(2-(2,4,5-trichlorophenoxy) propionic acid)
Endothal—3,6 endoxohydrophthalic acid)
Dalapon—(2,2-dichloropropionic acid)
Dicamba—(2-methoxy-4,6-dichlorobenzoic acid)
4-(2,4-DB)—(4-(2,4-dichlorophenoxy) butyric acid)
4-(3,4-DB)—(4-(3,4-dichlorophenoxy) butyric acid)
Amiben—(2,5-dichloro-3-aminobenzoic acid)
Mendok—(2,3-dichloro-2-methylpropionic acid)
MCP or MCPA—(4-chloro-2 methylphenoxyacetic acid)
MCPB—(4-(4-chloro-2-methylphenoxy) butyric acid)
MCPP—(2-(4-chloro-2-methylphenoxy) propionic acid)
MAA—(Methanearsonic acid)
DMA—(Dimethanearsonic acid)
Mediben—(2-methoxy-3,6-dichlorobenzoic acid)
MOPA—(alpha-methoxyphenylacetic acid)
Fenac—(2,3,6-trichlorophenylacetic acid)
PCP—(pentachlorophenol)
DNBP—(dinitrobutylphenol)
DNC—(dinitrocresol) 2,4,5-trichlorobenzoic acid
TBA—(2,3,6-trichlorobenzoic acid)
2,3,5,6-TBA—(2,3,5,6-tetrachlorobenzoic acid)
TCA—(trichloroacetic acid)
Alanap—(N-1 naphthylphthalamic acid)
Arsenic and arsonic acids.

Usually one equivalent of gilsonite to each carboxylic group in the acid is employed to make the salt. Mixtures of the acids may also be used. In carrying out the neutralization of the above salts with gilsonite, a solvent is preferably used, and this may be any polar or non-polar solvent such as, for example: isopropanol, methanol, acetone, diacetone, xylene, aromatic naphthalenes, and all the petroleum distillates.

Heat is also preferably utilized to speed up the reaction.

In the use of the herbicidal salts of the invention for plant growth control, 0.25 to 10 pounds (lb.) per acre are utilized dependent upon the plant(s) being controlled and the particular salt(s) employed. Mixtures of the salts may also be used.

In formulating emulsion type herbicidal compositions, such as those illustrated in Examples VI and VII above, the salt is first dissolved in the desired solvent, such as indicated in the preceding paragraph, then an appropriate emulsifier of the anionic, cationic, or nonionic type is added and the product emulsified in water to the desired spray concentration.

It will thus be seen that the objects set forth above, among those apparent from the preceding description, are efficiently attained, and, since certain changes may be made in carrying out the process, the product, and the composition of matter all described above, without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. The salts obtained by the reaction of the acids selected from the group consisting of the herbicidal acids and the plant hormone-type acids with a mixture of heterocyclic nitrogen compounds as contained in the crude, semi-purified or purified by-products having a boiling point of about 200° F. to 750° F. resulting from refining of gilsonite.

2. The salt obtained by the reaction of 3,6-endoxohydrophthalic acid with a mixture of heterocyclic nitrogen compounds as contained in the crude, semi-purified or purified by-products having a boiling point of about 200° F. to 750° F. resulting from refining of gilsonite.

3. A method for the preparation of gilsonite salts comprising reacting a mixture of heterocyclic nitrogen compounds as contained in the crude, semi-purified or purified by-products having a boiling point of about 200° F. to 750° F. resulting from refining of gilsonite with an acid selected from the group consisting of herbicidal acids and plant hormone-type acids to form the salt, said reaction being carried out using a reaction solvent and heat.

4. A method for the preparation of the gilsonite salt of 3,6-endoxohydrophthalic acid comprising reacting a neutral equivalent amount of a mixture of heterocyclic nitrogen compounds as contained in the crude, semi-purified or purified by-products having a boiling point of about 200° F. to 750° F. resulting from refining of gilsonite with said acid in the presence of a solvent and heat.

References Cited

UNITED STATES PATENTS 3,246,015   4/1966   Lindaberry et al. ___ 260—347.3

NICHOLAS S. RIZZO, Primary Examiner